June 21, 1949.  G. H. POHM  2,473,662
RECTIFYING ARRANGEMENT

Filed Aug. 2, 1944  2 Sheets-Sheet 1

INVENTOR.
GEORGE H. POHM
BY Woodling and Krost
ATTORNEYS.

Patented June 21, 1949

2,473,662

UNITED STATES PATENT OFFICE 2,473,662

RECTIFYING ARRANGEMENT

George H. Pohm, Lorain, Ohio, assignor, by mesne assignments, to Lorain Products Corporation, Lorain, Ohio, a corporation of Ohio Application August 2, 1944, Serial No. 547,775

14 Claims. (Cl. 175—363)

1

This invention relates to a regulated rectifying arrangement for supplying constant voltage direct current from a variable voltage source of alternating current.

My invention makes use of a leakage-reactance type transformer having a specially constructed leakage flux path. One portion of the transformer core is caused to saturate and is provided with a capacitor to aid in the saturation. Rectification is accomplished through the use of a polyphase rectifier energized with voltages displaced in phase from each other obtained from the leakage-reactance transformer. The phase displacement varies with varying load and by utilizing this shift in phase to produce polyphase rectification, I am able to increase the rectified voltage with increasing load in order to compensate for voltage drops in the circuit. Furthermore, changes in input voltage are compensated in the same unit by a combination of saturation and phase displacement effects.

It is an object of my invention to supply constant rectified voltage from a variable voltage alternating current source.

Another object of my invention is to produce polyphase rectification from a single phase source.

Another object of my invention is to produce a leakage reactance transformer having a saturable core portion and to utilize it in conjunction with a polyphase rectifier in order to compensate both for load and input voltage variations.

Still another object of my invention is to control the magnetization characteristics of the leakage flux path in my leakage reactance transformer, in order to provide precise regulation of the output voltage.

A further object of my invention is to provide a parallel winding arrangement for supplying two different rectified output voltages and for providing improved parallel operation of the rectifiers.

A still further object of my invention is to construct a leakage flux path having a plurality of portions of different magnetization characteristics in order to provide improved voltage regulation.

Other objects and a better understanding of my invention may be obtained by referring to the following specification and claims in connection with the accompanying drawings.

Figure 1 is a circuit diagram of an embodiment of my invention showing diagrammatically a leakage reactance transformer having a leakage flux path made in accordance with my invention.

2

Figure 1:
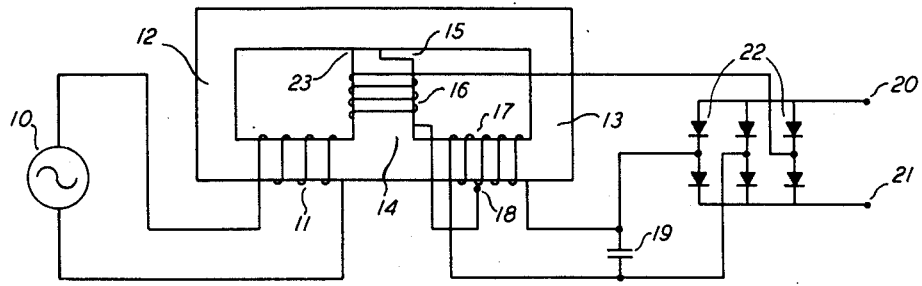

With more particular reference to Figure 1, there is shown a magnetic core structure of the leakage reactance type having a main flux path with primary portion 12 and secondary portion 13 and a leakage flux path 14. Primary portion 12 is magnetized by primary winding 11 which is energized from the source 10; the secondary core portion 13 is provided with a winding 17 connected to capacitor 19 which aids in magnetizing the secondary core portion. The leakage flux path 14 carries the difference in flux between the primary and secondary core portions and therefore is magnetically in parallel with the secondary flux path. Part of the leakage flux path is provided with an air gap 15 which is shown to an exaggerated scale on the drawing, and another part of the leakage path is provided with a much smaller gap 23, which, in fact, may be made small enough in order to provide a substantially closed flux path. The leakage flux path 14 is provided with winding 16 which is connected to tap 18 on winding 17 and to the polyphase rectifier 22.

The secondary core member 13 is magnetized from the source 10 through the action of primary winding 11 and is also magnetized by the capacitive current through winding 17 provided by capacitor 19. The secondary core member 13 is preferably proportioned to saturate under the combined magnetization, and because of its saturation, tends to minimize variations in the flux density in this portion of the core. When the voltage of source 10 increases, the saturation of the secondary core portion 13 tends to reject any increase in secondary flux so that most of the additional flux flows through the leakage path provided by core member 14. The induced voltage appearing in winding 17, which is one phase of the rectifier supply voltage, therefore fluctuates only slightly with large variations in the voltage of source 10, and consequently the rectified output voltage appearing on the terminals 20 and 21 at light loads is stabilized. As the load current supplied from terminals 20 and 21 increases, a phase shift occurs between the voltage induced in winding 17 and that induced in winding 16 which is on the leakage core member. The relative magnitudes of the voltages also change. Under some load conditions, the phase relationship between the voltages in windings 16 and 17 may approximate ninety degrees. Tap 18 on winding 17 may be located near the center of this winding and in this case, the voltage supplied to the three-phase rectifier 22 may approximate a balanced three phase voltage. Since the rectified voltage obtained from a balanced three-phase rectification approaches the crest value of the applied voltage, the output voltage of the rectifier tends to rise increasing load up to this point. Under light loads the polyphase rectification becomes greatly unbalanced so the output voltage has a tendency to be lower. The increase in voltage with increasing load compensates for the normal resistance and reactance voltage drops which occur in the circuit.

I have found that by providing the leakage flux member 14 with a non-uniform air gap, I am able to produce accurate compensation of the voltage drops in the circuit both for heavy loads and for light loads. In Figure 1 I provide the leakage flux path 14 with an air gap 15 over a portion of its area and a much smaller gap 23 over the remaining area. The drawings show this feature diagrammatically to an exaggerated scale and without attempting to indicate the exact proportions between the two air gaps. The air gap 23 is preferably made very small, and in fact may be so small that this portion of the flux path becomes nearly a closed magnetic circuit. I have found that the leakage flux through the small air gap 23 produces its chief effect under light loads while the flux through the larger air gap 15 appears to be more effective at heavier loads. My invention, therefore, provides a means for independently controlling the compensation under light and heavy loads so that a highly accurate overall compensation is obtainable.

Although I have shown only two different portions in the leakage flux path, more than two portions may be provided if still more accurate control is to be obtained. Furthermore, I have found that by varying the total cross-sectional area of the member 14 and by varying the relative lengths and area of the air gaps 15 and 23, I am also able to increase the accuracy of the compensation for variations in the voltage of source 10. In providing the optimum compensation, the tap 18 may not be centrally located on the winding 17 and the voltage applied to the rectifier 22 may never become a balanced three phase voltage. However, the principles involved can be most readily understood when described in terms of a balanced three phase voltage and therefore this method of explanation has been used.

Figure 2:
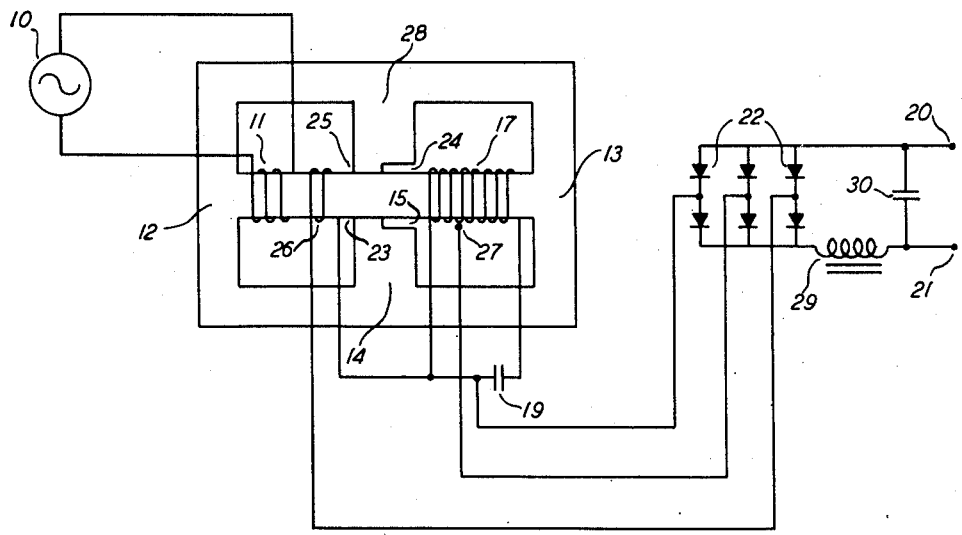
Figure 2 is a modification of the circuit of Figure 1 in which a shell-type transformer construction is used.

The arrangement of Figure 2 is that of a shell-type transformer construction utilizing the principles explained in connection with Figure 1. In Figure 2, the leakage flux paths are not provided with windings, the winding 26 on the primary core portion 12 being used to take the place of the winding 16 in Figure 1. In Figure 2, winding 17 supplies capacitor 19 in the same manner as in Figure 1 and the combined magnetization of secondary core portion 13 produced from the primary winding 11 and the capacitive current through winding 17, saturates the secondary core portion. Tap 27 on winding 17 supplies the rectifiers 22 with a voltage lower than that supplied to capacitor 19. In this manner, a higher voltage may be applied to capacitor 19 to effect an economy in the cost of this capacitor.

Winding 26 on the primary core portion 12 is connected to one end of the secondary winding 17 and is also connected to rectifier 22. Since winding 26 is magnetically coupled to winding 11, its voltage will vary with the voltage of source 10 and will be substantially in phase with the voltage of source 10. The phase of the secondary voltage induced in winding 17 varies with the loading and with the input voltage, so that a phase-displacement is produced and supplied to the polyphase rectifier in order to produce the required regulating characteristics as explained in connection with Figure 1. As previously mentioned, it is not necessary that the windings be proportioned to provide a balanced three phase voltage to the rectifier, but merely that the phase-displaced voltage be of the proper magnitude to compensate for the variations in load and to provide a regulated rectified voltage at the output terminals 20 and 21.

The leakage flux in Figure 2 flows through the core members 14 and 28 which are preferably made substantially alike and having air gaps 15 and 24 across part of their area. It is also possible to provide the leakage members 14 and 21 with uniform but unequal air gaps, so that one member becomes the short air gap portion and the other is the longer air gap portion of the leakage path. The shorter air gaps or closed flux paths 23 and 25 are provided to produce the improved regulation as obtained in the arrangement of Figure 1. As explained in connection with Figure 1, the lower reluctance portions 23 and 25 of the leakage flux paths provide compensation for voltage drops occurring in the circuit with relatively light loads while the leakage flux through the air gaps 15 and 24 provides compensation for the heavier load currents. Although the compensating winding 26 is not wound on the leakage flux path, nevertheless since the leakage flux is substantially the difference between the primary flux in the core portion 12 and the secondary flux in the core portion 13; therefore, the combination of voltages from the primary and secondary core portions obtained in Figure 2 can replace the voltage induced in winding 16 in Figure 1.

As previously explained, the relative areas of the leakage flux paths as compared with the primary and secondary flux paths are adjusted together with the reluctances of the different portions of the leakage flux paths in order to provide compensation for both the variations in the voltage of source 10 and the variations in load supplied from the output terminals 20 and 21. With the arrangement shown, using dry disc rectifiers, I have been able to obtain an output voltage on terminals 20 and 21 regulated within plus or minus one-half of one per cent for variations in load from 5 per cent load to 100 per cent load and simultaneous variations of the source voltage within the range of 105 to 125 volts. In addition, the simplicity and compactness of the arrangement results in a high efficiency throughout the operating range.

The filter choke 29 and condenser 30 in Figure 2 are used to minimize the A. C. component of the rectified output voltage. Because of the polyphase rectification taking place under heavy loads, and because I am able to supply the rectifiers with a flat-topped voltage under light loads, filtering the output becomes a relatively simple problem and I am able to obtain an output voltage substantially free of ripple by the use of relatively small filter elements. When the output of the rectifier is used to charge a storage battery, capacitor 30 may be omitted since it would be directly in parallel with the low impedance of the storage battery and would therefore have little effect.

Figure 3:
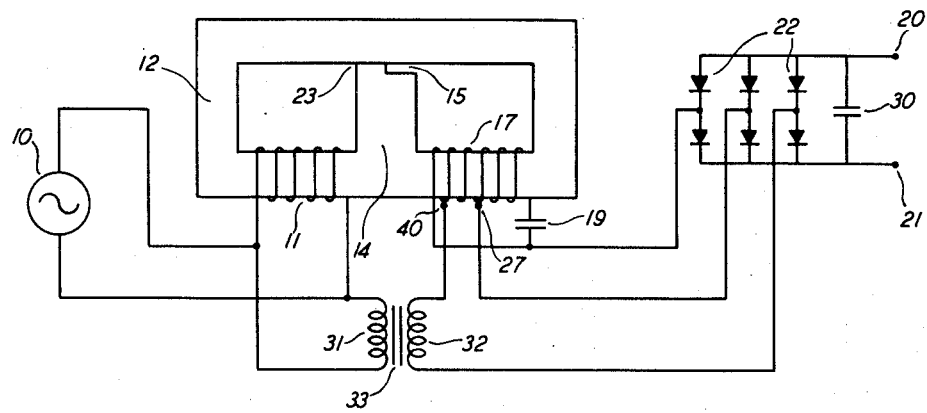
Figure 3 is another modification of the circuit of Figure 1 in which a separate transformer is provided for coupling voltage from source 10 to the rectifier.

Figure 3 is a modification of the circuit of Figure 2 using a core-type transformer and making use of a separate insulating transformer 33 to take the place of compensating winding 26 in Figure 2. In some cases an advantage may be obtained with the circuit of Figure 3 by the elimination of one of the windings on the leakage reactance transformer structure. This results in a considerable saving in space for the primary winding 11, the saving being especially great when high voltage insulation is required between the primary and rectifier circuits.

Primary winding 31 of transformer 33 is energized directly from source 10 and coupled to secondary winding 32 which supplies compensating voltage to one phase of the rectifier 22. Secondary winding 17 of the leakage reactance transformer is provided with an additional tap 40 connected to winding 32 to provide variation of the phase displacement obtained with the circuit of Figure 2. In general, I have found that the use of tap 40 makes it possible to obtain a more nearly balanced three phase voltage at the terminals of the rectifier than is otherwise obtained and this feature may be included in the circuit of Figure 2 although it does not necessarily produce improved regulation. The filtering of the output voltage in Figure 3 is accomplished simply by the capacitor 30. The use of a capacitor input filter such as this generally requires modification in the proportioning of the other circuit elements in order to obtain optimum regulation of the output voltage, but at the same time an improved dynamic characteristic may be obtained. When the filter inductance 29 shown in Figure 2 is in the circuit, the sudden application or removal of load produces a voltage across this inductance which tends to drop the load voltage when load is applied and raise it when the load is removed; whereas in the circuit of Figure 3, the load is connected directly to the rectifier to minimize any transients which may occur.

Figure 4:
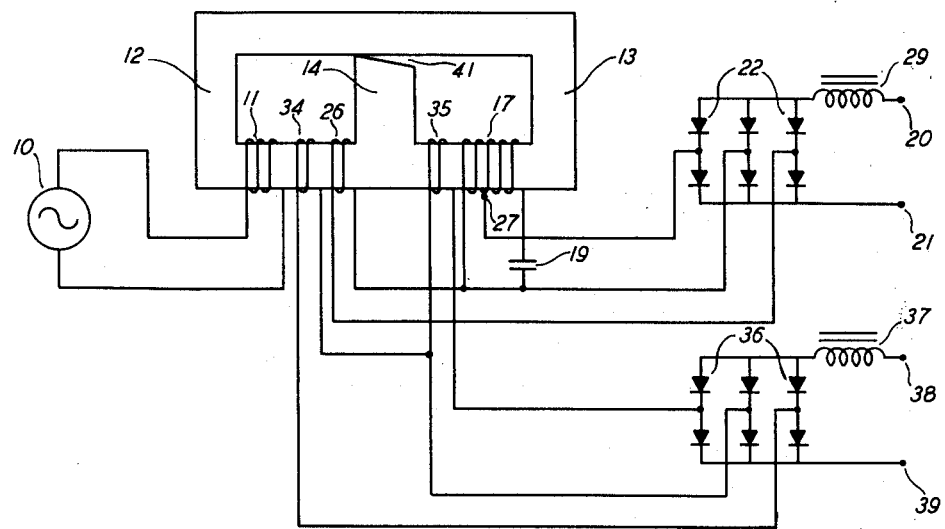
Figure 4 shows a modified leakage-flux arrangement and also shows parallel windings supplying two sets of polyphase rectifiers whose output terminals may be connected in series or parallel to provide high or low output voltage.

Figure 4 shows a parallel winding arrangement supplying two sets of polyphase rectifiers 22 and 36. The principles of operation are substantially the same as those of the circuit of Figure 2 with the exception of the additional output arrangement. Winding 35 on the secondary core portion 13 is connected to rectifier 36 and is substantially in parallel with the portion of winding 17 which is connected to rectifier 22. Winding 34 on the primary core portion 12 is connected to winding 35 and to rectifier 36 and is substantially in parallel with winding 26 which is connected to rectifier 22. I prefer to make windings 26 and 34 substantially alike and the portion of winding 17 which is connected to the rectifier 22 substantially equal to the secondary winding 35. The output voltage supplied from terminals 20 and 21 is therefore substantially equal to the output voltage supplied from terminals 38 and 39. When a low output voltage is required, terminal 20 is connected to terminal 38 and terminal 21 to terminal 39 providing parallel output having twice the current capacity of the individual rectifiers 22 and 36. When higher output voltage is required, terminal 21 may be connected to terminal 38 and an output voltage equal to twice the voltage supplied by each rectifier is supplied on the terminals 20 and 39.

Inductances 29 and 37 provide individual filtering for the rectified voltages. I prefer to place both these inductances on the same core, in order to provide the best filtering action and to minimize the size and weight of the entire assembly.

The parallel winding arrangement shown has numerous advantages not obtained by simply connecting the A. C. windings either in series or in parallel to obtain the different output voltages. Firstly, by making the series or parallel connections in the D. C. circuit, there are only two pairs of wires to be interconnected instead of the three pairs of wires appearing in the A. C. side of the rectifiers. Furthermore, it is well known that in some cases parallel windings on the same core may have slightly different induced voltages and therefore will produce undesirable circulating current. This possibility does not exist with the arrangement shown in Figure 4. In addition, the direct parallel connection of the dry disc or gaseous discharge rectifiers is in general undesirable, because of differences that may exist between individual elements of the rectifiers. This is particularly true of gaseous discharge rectifiers but is also a factor in the operation of the dry-disc type rectifiers. When the rectifiers of Figure 4 are connected in parallel with each other, there is little danger of any great inequalities in the loading of the rectifier bridges. This is true because each rectifier has its own supply circuit and filter choke and the voltage drops in these elements tend to reduce the output voltage of the rectifier bridge which is attempting to carry more than its share of the load.

In some cases, individual insulated rectified voltages may be required and in these instances separate loads may be connected to the pairs of output terminals 20, 21 and 38, 39.

Figure 4 also shows a modified leakage flux arrangement, in which the leakage member 14 is provided with a non-uniform gap 41. This arrangement replaces the two-section air gap shown in Figures 1, 2 and 3. As previously mentioned, more than two air-gap portions may sometimes be used advantageously; in effect, a very large number of sections are provided by the structure shown in Figure 4 and in this manner the ultimate accuracy of compensation is obtainable. By controlling the cross-sectional area of leakage member 14 and the maximum and minimum thickness and the shape of the non-uniform air gap 41, the actual voltage drops occurring in the circuit can be accurately compensated. The exact proportions required depend on the core configuration, the grade of magnetic material and the resistance of the rectifiers, together with the other circuit constants.

The drawings shown herein are diagrammatic in nature and are not intended to show the proportioning of the core structure or the various parts thereof. It will also be apparent to those skilled in the art that different core configurations may be utilized for the purpose described without departing from the true scope of this invention. Furthermore, although the arrangements shown all utilize three-phase rectification, other types of polyphase rectification may readily be applied.

Although I have described my invention with a certain degree of particularity, it is understood

I claim as my invention:

1. A rectifying arrangement comprising in combination a polyphase rectifier, a transformer having a main flux path with a saturable portion and a leakage flux path magnetically in parallel with the saturable portion, said leakage flux path having a plurality of portions having differing magnetization characteristics, at least one of said portions having a non-linear magnetization characteristic, said transformer having a plurality of windings, one of which is adapted to be connected to a source of single-phase alternating current, a capacitor connected to another of said windings and adapted to provide magnetizing current for said saturable portion of the main flux path, and circuit connecting means for energizing the polyphase rectifier from said plurality of windings.

2. A control circuit adapted to be energized by a single-phase source of alternating current, comprising in combination, a polyphase rectifier, a magnetic core having primary and secondary core portions, a leakage core member magnetically in parallel with the secondary core portion, primary winding means on the primary core portion adapted to be connected to the single-phase source, secondary winding means on the secondary core portion, a capacitor connected to the secondary winding means, said secondary core portion being saturable, said leakage core member having a plurality of sections of differing magnetization characteristics, a transformer connected across said source, and output circuit means for energizing said rectifier from said secondary winding means and from said transformer.

3. A control circuit adapted to be energized by a single-phase source of alternating current, comprising in combination, a magnetic core having primary and secondary core portions, a leakage core member magnetically in parallel with the secondary core portion, primary winding means on the primary core portion adapted to be connected to the single-phase source, secondary winding means on the secondary core portion, a capacitor connected to the secondary winding means, said secondary core portion being saturable, said leakage core member having a plurality of sections of differing magnetization characteristics, at least one of said sections having a non-linear magnetization characteristic, output winding means inductively related to said secondary core portion and said leakage core member, and a polyphase rectifier connected to said output winding means.

4. A rectifying arrangement comprising in combination a magnetic core having a main flux path with a saturable portion and a leakage flux path magnetically in parallel with the saturable portion, said leakage path having a plurality of portions having differing magnetization characteristics, at least one of said portions having a non-linear magnetization characteristic, a plurality of windings on said core, a capacitor connected to one of said windings adapted to supply magnetization for said saturable portion, another of said windings being adapted to be energized from a single phase source of alternating current, a polyphase rectifier, first circuit means inductively related to said saturable portion and second circuit means coupled to said source, said rectifier being adapted to be energized by said first and second circuit means.

5. A rectifying arrangement comprising in combination a leakage-reactance type transformer having primary and secondary core portions, said secondary core portion being saturable, the leakage reactance being provided by leakage flux means comprising a plurality of core portions having differing magnetization characteristics, at least one of said portions having a non-linear magnetization characteristic, primary winding means on the primary core portion adapted to be energized by a source of alternating current, secondary winding means on the secondary core portion, a capacitor connected to the secondary winding means, a polyphase rectifier, and output circuit means inductively related to the primary and secondary core portions and connected to said polyphase rectifier.

6. A rectifying arrangement comprising in combination a leakage-reactance type transformer having primary and secondary core portions, said secondary core portion being saturable, the leakage reactance being provided by leakage flux means comprising a plurality of core portions having differing magnetization characteristics, primary winding means on the primary core portion adapted to be energized by a source of alternating current, secondary winding means on the secondary core portion, a capacitor connected to the secondary winding means, a plurality of polyphase rectifiers, a circuit means for connecting said rectifiers to a common direct-current load circuit, a plurality of substantially equal output windings on said secondary core portion and a plurality of substantially equal output windings on the primary core portion, said rectifiers being adapted to be energized with substantially equal voltages from said output windings.

7. A rectifying arrangement comprising in combination a magnetic core having a main flux path with a saturable portion and a leakage flux path magnetically in parallel with the saturable portion, a plurality of windings on said core, a capacitor connected to one of said windings adapted to supply magnetization for said saturable portion, another of said windings being adapted to be energized from a single phase source of alternating current, a polyphase rectifier, first circuit means inductively related to said saturable portion and second circuit means including a transformer coupled to said source, said rectifier being adapted to be energized by said first circuit means and the transformer of said second circuit means, said leakage flux path comprising a plurality of portions having unequal magnetization characteristics, at least one of said portions having a non-linear magnetization characteristic.

8. A rectifying arrangement comprising in combination a polyphase rectifier, a capacitor, a magnetic core having a main flux path with a saturable portion and a leakage flux path magnetically substantially in parallel with said saturable portion, said leakage flux path having a magnetic portion with a non-linear magnetization characteristic and having a non-magnetic gap portion of non-uniform thickness therein, first winding means on the magnetic core adapted to be energized by a single-phase source of alternating current, second winding means on the core connected to the capacitor, said capacitor being adapted to supply magnetizing current for said saturable core portion, and output circuit means inductively related to said magnetic core for supplying the rectifier with polyphase voltage when heavily loaded.

9. A rectifying arrangement comprising in combination a leakage-reactance type transformer having primary and secondary core portions, said secondary core portion being saturable, primary winding means on the primary core portion adapted to be energized by a source of alternating current, secondary winding means on the secondary core portion, a capacitor connected to the secondary winding means, a plurality of polyphase rectifiers, circuit means for connecting said rectifiers to a common direct-current load circuit, a plurality of substantially equal output windings on said secondary core portion, and a plurality of substantially equal output windings on the primary core portion, said rectifiers being adapted to be energized with substantially equal voltages from said output windings.

10. A rectifying arrangement comprising in combination a leakage-reactance transformer having primary and secondary core portions, said secondary core portion being saturable, a leakage-flux member having a magnetic portion with a non-linear magnetization characteristic and having a non-uniform non-magnetic gap portion therein, primary winding means on the primary core portion adapted to be energized by a single-phase source of alternating current, secondary winding means on the secondary core portion, a capacitor connected to the secondary winding means, a polyphase rectifier, and output circuit means inductively related to the primary and secondary core portions and connected to said rectifier.

11. A rectifying arrangement comprising in combination a leakage-reactance transformer having primary and secondary core portions, said secondary core portion being saturable, a leakage-flux member having a magnetic portion with a non-linear magnetization characteristic and having a non-uniform non-magnetic gap portion therein, primary winding means on the primary core portion adapted to be energized by a single-phase source of alternating current, secondary winding means on the secondary core portion, a capacitor connected to the secondary winding means, a polyphase rectifier, and output circuit means inductively related to said transformer and connected to said rectifier and adapted to provide polyphase rectification under normal load of said rectifier.

12. In combination, a magnetic core, a first winding on said core adapted to be connected to a source of alternating current, a second winding on said core, a leakage flux path on said core for a portion of the flux in the core to thread through one of the windings to the exclusion of the other winding, said leakage flux path having a plurality of magnetically dissimilar portions, at least one of said portions having a non-linear magnetization characteristic, a resonant circuit operating at the source frequency and including said second winding and a condenser, a polyphase rectifier connected to output winding means inductively related to said magnetic core and adapted to provide phase displacements depending on load requirements on said rectifier to produce polyphase rectification under heavy loads.

13. In combination, a magnetic core, a first winding on said core adapted to be connected to a source of alternating current, a second winding on said core, a leakage flux path on said core for a portion of the flux in the core to thread through one of the windings to the exclusion of the other winding, said leakage flux path having a plurality of magnetically dissimilar portions, at least one of said portions having a non-linear magnetization characteristic, a resonant circuit operating at the source frequency and including said second winding and a condenser, a polyphase rectifier connected to output winding means inductively related to said second winding and to said source.

14. In combination, a magnetic core, a first winding on said core adapted to be connected to a source of alternating current, a second winding on said core, a leakage flux path on said core for a portion of the flux in the core to thread through one of the windings to the exclusion of the other winding, said leakage flux path having a plurality of magnetically dissimilar portions, at least one of said portions having a non-linear magnetization characteristic, a resonant circuit operating at the source frequency and including said second winding and a condenser, and a polyphase rectifier connected to output winding means inductively related to said second winding and said leakage flux path.

GEORGE H. POHM.

REFERENCES CITED

The following references are of record in the file of this patent:

UNITED STATES PATENTS

| Number | Name | Date |
| --- | --- | --- |
| 1,997,234 | Schmerber | Apr. 9, 1935 |
| 2,025,093 | Cotter et al. | Dec. 24, 1935 |
| 2,028,541 | Gilson | Jan. 21, 1936 |
| 2,103,996 | Bedford | Dec. 28, 1937 |
| 2,305,153 | Fries | Dec. 15, 1942 |
| 2,364,558 | Stocker | Dec. 5, 1944 |